United States Patent
Abe et al.

(10) Patent No.: US 7,229,708 B2
(45) Date of Patent: Jun. 12, 2007

(54) MAGNETIC ENCODER

(75) Inventors: Katsumi Abe, Fujisawa (JP); Kiyofumi Fukasawa, Fujisawa (JP); Hironori Nishina, Fujisawa (JP)

(73) Assignee: NOK Corporation, Tokyo (JP)

( * ) Notice: Subject to any disclaimer, the term of this patent is extended or adjusted under 35 U.S.C. 154(b) by 176 days.

(21) Appl. No.: 10/538,691

(22) PCT Filed: Sep. 12, 2003

(86) PCT No.: PCT/JP03/11697

§ 371 (c)(1),
(2), (4) Date: Jun. 10, 2005

(87) PCT Pub. No.: WO2005/026663

PCT Pub. Date: Mar. 24, 2005

(65) Prior Publication Data

US 2006/0275609 A1    Dec. 7, 2006

(51) Int. Cl.
*B32B 15/092* (2006.01)
(52) U.S. Cl. .................. 428/840.5; 428/418; 428/447; 384/448
(58) Field of Classification Search ............ 428/840.5, 428/418, 447; 384/448
See application file for complete search history.

(56) References Cited

U.S. PATENT DOCUMENTS

| 4,144,108 | A | * | 3/1979 | Gidley et al. ................. 156/60 |
| H317 | H | * | 8/1987 | Gladden ....................... 40/453 |
| 5,300,355 | A | * | 4/1994 | Mifune et al. .............. 428/215 |
| 6,268,056 | B1 | | 7/2001 | Mills |
| 2004/0220316 | A1 | * | 11/2004 | Abe et al. .................... 524/435 |

FOREIGN PATENT DOCUMENTS

| EP | 945498 A | 9/1999 |
| JP | 10-298527 | 11/1998 |
| JP | 2000-1658 A | 1/2000 |
| JP | 2000-104771 A | 4/2000 |
| JP | 2001-260235 A | 9/2001 |
| JP | 2002-11735 A | 1/2002 |
| JP | 2003-222150 A | 8/2003 |

OTHER PUBLICATIONS

English abstract JP 2004 028877 Jan. 29, 2004.*
English language translation JP 2004 150859 May 27, 2004.*
Machine generated translation JP 2001-260235 Sep. 25, 2001.*

* cited by examiner

*Primary Examiner*—Margaret G. Moore
(74) *Attorney, Agent, or Firm*—Butzel Long

(57) ABSTRACT

A magnetic encoder, which comprises a stainless steel sheet; and an under coat adhesive containing epoxy resin and organopolysiloxane, a top coat adhesive containing phenol resin, or phenol resin and epoxy resin, and a rubber magnet, as successively laid one upon another on the stainless steel sheet, has distinguished water resistance and saline water resistance, and thus can be effectively used particularly as a magnetic encoder in wheel speed sensors.

8 Claims, No Drawings

MAGNETIC ENCODER

TECHNICAL FIELD

The present invention relates to a magnetic encoder, and more particularly to a magnetic encoder with improved water resistance, saline water resistance, etc.

BACKGROUND ART

Magnetic encoders using a rubber magnet are excellent for detection of revolution rate at a low speed and recently have been widely used in wheel speed sensors, etc. Wheel speed sensors are used in the neighborhood position of wheel, requiring good water resistance and a saline water resistance. The magnetic encoder using a rubber magnet comprises a stainless steel sheet, a rubber magnet, and an adhesive for bonding these two. Water resistance tests show that peeling occurred at the interface between the stainless steel sheet and the adhesive of the magnetic encoder, and the water resistance of the adhesive as well as the rubber magnet itself is regarded as very important.

For the adhesive layer for the water resistance purpose, epoxy resin is usually used, but owing to poor adhesion to the stainless steel sheet, the epoxy resin is not used alone in case of the stainless steel sheet. In case of a single adhesive layer, a phenol resin-based adhesive, a silane-based adhesive, an epoxy resin/silane-based adhesive, or the like is used. In case of two adhesive layers, the afore-mentioned phenol resin-based adhesive, a phenol resin/halogenated polymer-bases adhesive, a phenol resin/epoxy resin-based adhesive, or the like is used as an under coat. However, even if these under coat adhesives are used in combination with various top coat adhesives, no statisfactory water resistance can be obtained in severe circumstances such as saline water spraying.

DISCLOSURE OF THE INVENTION

An object of the present invention is to provide a magnetic encoder with distinguished water resistance, saline water resistance, etc., which comprises a stainless steel sheet and a rubber magnet, both being bonded to each other through an epoxy resin-based adhesive.

The object of the present invention can be attained by a magnetic encoder, which comprises a stainless steel sheet; and an under coat adhesive containing epoxy resin and organopolysiloxane, a top coat adhesive containing phenol resin, or phenol resin and epoxy resin, and a rubber magnet as successively laid one upon another on the stainless steel sheet.

The stainless steel sheet for use in the present invention includes those of SUS304, SUS301, SUS430, etc. For the magnetic encoder use, the sheet thickness is usually about 0.2 to about 2 mm.

At first, an under coat adhesive containing epoxy resin and organopolysiloxane is applied to the stainless steel sheet. As the under coat adhesive containing epoxy resin and organopolysiloxane, an adhesive comprising epoxy resin, organopolysiloxane, which is a hydrolysis condensate of organoalkoxysilane represented by the general formula, $Xn—Si(OR)_{4-n}$ (where X is a functional group reactive with rubber or resin, R is a lower alkyl group and n is 1 or 2), colloidal silica, and amide- or imide-based epoxy resin curing agent, is preferably used.

The epoxy resin for use in the present invention includes, preferably those obtained by reaction of bisphenol A, bisphenol F or novolak resin with epichlorohydrin. Commercially available epoxy resin can be directly used as such an epoxy resin. For example, Epikote 154 (a product of Japan Epoxy Resin Co.), Epikote 157S70 (ditto), Epikote 180S65 (ditto), etc. can be used. Aquous emulsion-type epoxy resin can be also used. For example, Epi-Rez, 5003W55 (a product of Japan Epoxy Resin Co.), Epi-Rez 6006W70 (ditto), etc. can be used.

The organopolysiloxane for use in the present invention includes hydrolysis condensates of at least one of organoalkoxysilanes represented by the general formula $Xn—Si(OR)_{4-n}$, where X is a functional group reactive with rubber or resin such as methyl, ethyl, 3-aminopropyl, N-(2-aminoethyl)-3-aminopropyl, N-phenyl-3-aminopropyl, vinyl, 3-methacryloxypropyl, 3-glycidoxypropyl, 3-mercaptopropyl, etc., and R is a lower alkyl group such as methyl, ethyl, etc. The organoalkoxysilane represented by such a general formula includes, for example, vinyltrimethoxysilane, vinyltriethoxysilane, 3-aminopropyltriethoxysilane, 3-aminopropyltrimethoxysilane, N-β-(aminoethyl)-γ-aminopropyltrimethoxysilane, N-β-(aminoethyl)-γ-aminopropyltriethoxysilane, 3-glycidoxypropyltrimethoxysilane, 3-glycidoxypropylmethyldiethoxysilane, etc.

Hydrolysis condensation reaction of organoalkoxysilane is carried out by heating at about 40° to about 80° C. for about 3 to about 24 hours in the presence of an acid catalyst such as formic acid, acetic acid, etc. while keeping at least an equivalent weight of water for hydrolysis present. Such hydrolysis condensates are preferably copolymerization oligomers of amino group-containing alkoxysilane and vinyl group-containing alkoxysilane. The amino group-containing alkoxysilane as one member of the copolymerization oligomers includes, for example, γ-aminopropyltriethoxysilane, γ-aminopropyltrimethoxysilane, N-β-(aminoethyl)-γ-aminopropyltrimethoxysilane, N-β-(aminoethyl)-γ-aminopropyltriethoxysilane, etc. The vinyl group-containing alkoxysilane as another counterpart member includes, for example, vinyltrimethoxysilane, vinyltriethoxysilane, etc.

In the oligomerization reaction, 100 parts by weight of amino group-containing alkoxysilane, 25 to 400 parts by weight, preferably 50 to 150 parts by weight, of vinyl group-containing alkoxysilane, and 20 to 150 parts by weight of water for hydrolysis are used. When more than 400 parts by weight of vinyl group-containing alkoxysilane is used, the compatibility with the top coat adhesive or rubber will be deteriorated and consequently the adhesiveness will be lowered, whereas in case of less than 25 parts by weight the water resistance will be lowered.

The oligomerization reaction is carried out by charging these alkoxysilanes into a reactor provided with a distillation appratus and a stirrer, followed by stirring at about 60° C. for about one hour, then adding thereto about 1 to about 2 moles of an acid such as formic acid or acetic acid on the basis of one mole of the amino group-containing alkoxy-silane within one hour, while keeping the reactor temperature at about 65° C., followed by further stirring for 1 to 5 hours to proceed with the reaction and distill off alcohol formed by hydrolysis under reduced pressure at the same time, discontinuing the distillation when the distillate is turned into only water, and diluting the residue to a silane concentration of 30 to 80 wt. %, thereby obtaining the desired copolymerization oligomer. The copolymerization oligomer is soluble in an alcoholic organic solvent such as methanol, ethanol, etc. Commercially available copolymerization oligomers can be used as such.

Colloidal silica for use in the present invention has particle sizes of not more than 50 nm and is selected in view of the species of a solvent to be used. For example, when the solvent is water, commercially available products Snowtex 20 (a product of Nissan Chemical Industries, Ltd.), Snowtex 30 (ditto), etc. are used. When the solvent is an organic solvent, Snowtex MEK-ST (ditto; dispersion in methyl ethyl ketone), Snowtex MIBK-ST (ditto; dispersion in methyl isobutyl ketone), etc. are used. To improve the film strength, colloidal silica is used in the following mixing proportion.

As an amide- or imide-based epoxy resin curing agent, dicyandiamide, methylimidazole, etc. are used.

The components of the under coat adhesive are used in such proportions as 45 to 75 wt. %, preferably 55 to 65 wt. %, of epoxy resin; 10 to 40 wt. %, preferably 25 to 35 wt. %, of organopolysiloxane; 3 to 10 wt. %, preferably 5 to 8 wt. % of colloidal silica; and 0 to 5 wt. %, preferably 0.5 to 3 wt. % of amide- or imide-based epoxy resin curing agent, upon blending. When the organopolysiloxane is used in a proportion of less than 10 wt. %, the adhesiveness to stainless steel sheet will be deteriorated, whereas in a proportion of more than 40 wt. % no improvement effect on the water resistance and saline water resistance will be obtained.

As a solvent for the under coat adhesive comprising the foregoing components such epoxy resin and organopolysiloxane, water or an organic solvent is usually used. Any organic solvent can be used, so far as it can dissolve epoxy resin, and acetone, methyl ethyl ketone, etc. are preferably used. The under coat adhesive is a solution having a concentration of about 1 to about 30 wt. %.

The under coat adhesive comprising epoxy resin and organopolysiloxane is applied to a stainless steel sheet to a film thickness of about 5 to about 30 μm by dipping coating, spraying coating, brush coating, etc., followed by drying at room temperature and further drying at about 50° to about 250° C. for about 5 to about 30 minutes.

A phenol resin-based top coat adhesive is applied as a vulcanization adhesive to the under coat adhesive comprising epoxy resin and organopolysiloxane laid on the stainless steel sheet. Commercially available phenol resin-based adhesives can be used as such, and include, for example, Thixon 715 (a product of Rohm & Haas Co.). Metaloc N31 (a product of Toyo Kagaku Kenkyusho K.K.), Chemlok TS1677-13 (a product of Rhodes Far East Co.) etc. An adhesive containing phenol resin and epoxy resin, for example, Metaloc XPH-27 (a product of Toyo Kagaku Kenkyusho K.K.), a composition containing novolak type epoxy resin and novolak type phenol resin derived from p-substituted phenol, disclosed in JP-A-4-13790, etc. can be used. The same application method, application temperature, and application time as in the case of the under coat adhesive are also applied to the top coat adhesive to form a top coat adhesive layer having a film thickness of about 5 to about 30 μm.

An unvulcanized rubber magnet is bonded to the adhesive layer so formed, and subjected to press vulcanization molding at about 150° to about 200° C. for about 5 to about 60 minutes to form a rubber magnet layer having a thickness of about 0.5 to about 2 mm. Any rubber can be used for the rubber magnet, so far as it can be bonded to the top coat adhesive, and NBR, ethylene-methyl acrylate copolymerization rubber (AEM), etc. can be preferably used. Above all, a rubber composition for magnetic encoder, which comprises ethylene-methyl acrylate copolymerization rubber as a base polymer, magnetic powder such as ferrite magnet powder, etc. (usually used about 450 to about 1,000 parts by weight on the basis of 100 parts by weight of the base polymer) and an amine-based vulcanizing agent can give a rubber magnet with distinguished heat resistance, water resistance and saline water resistance.

BEST MODES FOR CARRYING OUT THE INVENTION

The present invention will be described below, referring to Examples.

REFERENCE EXAMPLE 40 parts by weight of γ-aminopropyltriethoxysilane and 20 parts by weight of water were charged into a three-necked flask provided with a stirrer, a heating jacket and a dropping funnel, and pH was adjust to 4 to 5 with acetic acid, followed by stirring for several minutes. While further continuing stirring, 40 parts by weight of vinyltriethoxysilane was slowly dropwise added thereto through a dropping funnel. After the dropwise addition, heating and refluxing were carried out at about 60° C. for 5 hours, followed by cooling to room temperature to obtain copolymerization oligomer. The thus obtained amino group/vinyl group-containing oligomer (organopolysiloxane) was used as a component in the following adhesives A and B.

Examples 1 to 5 and Comparative Examples 1 to 6

At first, an under coat adhesive was applied to an SUS430 stainless steel sheet, followed by air drying at room temperature and successive drying at 200° C. for 10 minutes, and then a top coat adhesive was applied thereto, followed by air drying at room temperature and successive drying at 150° C. for 10 minutes. An unvulcanized rubber magnet was bonded thereto, followed by press vulcanization at about 150° to about 200° C. for about 5 to about 60 minutes to obtain a raw material for the magnetic encoder.

|   |   | Parts by weight |
|---|---|---|
| | (Adhesive) | |
| | Remark: Figures in parentheses shows parts by weight on solid basis | |
| A: | DPP Novolak type epoxy resin (Epi-Rez 5003W55, a product of Japan Epoxy Resin Co.; solid concentration: 57 wt. %) | 175(100) |
| | Amino group/vinyl group-containing organopoly-siloxane (solid concentration: 36.5 wt. % in aqueous solution) | 115(42) |
| | Colloidal silica (Snowtex 20, a product of Nissan Chemical Industries, Ltd.; solid concentration: 20 wt. % in aqueous dispersion) | 50(10) |
| | Dicyandiamide (epoxy resin curing agent) | 4 |
| | Water | 1610 |
| B: | o-Cresol novolak type epoxy resin (Epikote 180S65, a product of Japan Epoxy Resin Co.) | 100(100) |
| | Amino group/vinyl group-containing organosiloxane (Solid concentration: 15 wt. % in acetone solution) | 280(42) |
| | Colloidal silica (Snowtex MEK-ST; a product of Nissan Chemical Industries, Ltd; solid concentration: 30 wt. % in methyl ethyl ketone) | 33(10) |
| | Dicyandiamide (epoxy resin curing agent) | 4 |
| | Methyl ethyl ketone | 1535 |
| C: | Phenol resin-based (Thixon 715, a product of Rhom & Haas Co.) | |
| D | Phenol resin-based (Metaloc N-31, a product of Toyo Kagaku Kenkyusho K.K.) | |
| E: | Phenol resin-based (Chemlok TS1677, a product of Rhodes Far East Co.) | |

-continued

| | Parts by weight |
|---|---|
| F: | Phenol resin/epoxy resin-based (Metaloc PH-20, a product of Toyo Kagaku Kenkyusho K.K.) |
| G: | Phenol resin/epoxy resin-based (Metaloc XPH-27, a product of Toyo Kagaku Kenkyusho K.K.) |
| H: | Phenol resin/halogenated polymer-based (Chemlok 205, a product of Lord Far East Co.) |

The foregoing adhesives, C to H, were all diluted to a solid concentration of 8 wt. % with methyl ethyl ketone, before use.

Initial adhesiveness test: To determine percent retained rubber (R) in the initial state, according to JIS K-6256 90° peeling test procedure Water resistance test: To determine percent retained rubber (R) after dipping a peeling test piece in water at 80° C. for 70 hours or 140 hours, according to JIS K-6256 90° peeling test procedure Saline water energized test: To determine percent retained rubber (R) after applying a 2A steady-state current (maximum volt: 16V) to between a JIS K-6256 90° peeling test piece at a − electrode and an aluminum plate at a + electrode in an aqueous 3 wt. % sodium chloride solution at 30° C. for 5 hours or 10 hours, according to JIS Z-2371

Results of determination in the foregoing Examples 1 to 5 and Comparative Examples 1 to 6 are shown in the following Table 1, together with the species of the under coat adhesives and the top coat adhesives.

TABLE 1

| Test item | | Example No. 1 | 2 | 3 | 4 | 5 | Comparative Example No. 1 | 2 | 3 | 4 | 5 | 6 |
|---|---|---|---|---|---|---|---|---|---|---|---|---|
| [Under coat adhesive] | | | | | | | | | | | | |
| Species | | A | A | A | A | B | A | B | C | C | F | H |
| [Top coat adhesive] | | | | | | | | | | | | |
| Species | | C | D | E | G | C | — | — | — | C | C | C |
| [Initial adhesiveness test] | | | | | | | | | | | | |
| Initial | (R; %) | 100 | 100 | 100 | 100 | 100 | 100 | 100 | 100 | 100 | 100 | 100 |
| [Water resistance test] | | | | | | | | | | | | |
| After 70 hrs | (R; %) | 100 | 100 | 100 | 100 | 100 | 100 | 100 | 80 | 90 | 100 | 80 |
| After 140 hrs | (R; %) | 100 | 100 | 100 | 100 | 100 | 80 | 80 | 20 | 50 | 80 | 20 |
| [Saline water energized test] | | | | | | | | | | | | |
| After 5 hrs | (R; %) | 100 | 95 | 100 | 100 | 95 | 80 | 80 | 0 | 30 | 90 | 20 |
| After 10 hrs | (R; %) | 95 | 90 | 95 | 95 | 90 | 40 | 40 | 0 | 0 | 50 | 0 |

Examples 6 to 10 and Comparative Examples 7 to 12

In Examples 1 to 5 and Comparative Examples 1 to 6, an unvulcanized rubber magnet having the following composition was used:

-continued

| (Unvulcanized rubber magnet) | Parts by weight |
|---|---|
| NBR (N220S, a product of JSR) | 90 |
| Liquid NBR (Nipol 1312, a product of Nippon Zeon Co,. Ltd.) | 10 |
| Strontium ferrite powder (FH-801, a product of Toda Kogyo K.K.) | 800 |
| Zinc white | 3 |
| Antioxidant (Nocrack CD, a product of Ouchi Shinko Kagaku K.K.) | 2 |
| Stearic acid | 2 |
| Plasticizer (RS700, a product of Asahi Denka Kogyo K.K.) | 5 |
| Sulfur | 0.8 |
| Cross-linking aid (Nokceller TT, a product of Ouchi Shinko Kagaku K.K.) | 2 |
| Cross-linking aid (Nokceller CZ, a product of Ouchi Shinko Kagaku K.K.) | 1 |

| | Parts by weight |
|---|---|
| AEM (Vamac G, a product of DuPont-Dow Elastomer Co.) | 100 |
| Strontium ferrite powder (FH-801, a product of Toda Kogyo K.K.) | 700 |
| Stearic acid | 2 |
| Antioxidant (Nocrack CD, a product of Ouchi Shinko Kagaku K.K.) | 2 |
| Plasticizer (RS735, a product of Asahi Denka Kogyo K.K.) | 10 |
| Cross-linking aid (Nokceller DT, a product of Ouchi Shinko Kagaku K.K.) | 4 |
| Cross-linking agent (Diac No. 1 a product of DuPont-Dow Elastomer Co.) | 2 |

The foregoing adhesives, C to H, were all diluted to a solid concentration of 8 wt. % with methyl ethyl ketone, before use.

The raw materials for the magnetic encoder obtained in the foregoing Examples and Comparative Examples were subjected to an initial adhesiveness test, a water resistance test, and a saline water energized test.

Raw materials for the magnetic encoder obtained in the foregoing Examples 6 to 10 and Comparative Examples 7 to 12 were subjected to an initial adhesiveness test, a water resistance test, and a saline water energized test. Results of determination are shown in the following Table 2 together with the species of the under coat adhesives and the top coat adhesives used therein.

TABLE 2

| | Example No. | | | | | Comparative Example No. | | | | | |
|---|---|---|---|---|---|---|---|---|---|---|---|
| Test item | 6 | 7 | 8 | 9 | 10 | 7 | 8 | 9 | 10 | 11 | 12 |
| [Under coat adhesive] | | | | | | | | | | | |
| Species | A | A | A | A | B | A | B | C | C | F | H |
| [Top coat adhesive] | | | | | | | | | | | |
| Species | C | D | E | G | C | — | — | — | C | C | C |
| [Initial adhesiveness test] | | | | | | | | | | | |
| Initial (R; %) | 100 | 100 | 100 | 100 | 100 | 100 | 100 | 100 | 100 | 100 | 100 |
| [Water resistance test] | | | | | | | | | | | |
| After 70 hrs (R; %) | 100 | 100 | 100 | 100 | 100 | 100 | 100 | 95 | 95 | 100 | 95 |
| After 140 hrs (R; %) | 100 | 100 | 100 | 100 | 100 | 95 | 95 | 40 | 60 | 95 | 40 |
| [Saline water energized test] | | | | | | | | | | | |
| After 5 hrs (R; %) | 100 | 100 | 100 | 100 | 100 | 100 | 100 | 20 | 30 | 100 | 30 |
| After 10 hrs (R; %) | 100 | 100 | 100 | 100 | 100 | 70 | 70 | 0 | 0 | 70 | 0 |

INDUSTRIAL UTILITY

The present magnetic encoder has distinguished water resistance and saline water resistance, and thus can be effectively used particularly as a magnetic encoder for wheel speed sensors.

The invention claimed is:

1. A magnetic encoder, which comprises a stainless steel sheet; and an under coat adhesive containing epoxy resin and organopolysiloxane, a top coat adhesive containing phenol resin, or phenol resin and epoxy resin, and a rubber magnetic as successively laid one upon another on the stainless steel sheet.

2. A magnetic encoder according to claim 1, wherein a base polymer of the rubber magnet is NBR or ethylene-methyl acrylate copolymerization rubber.

3. A magnetic encoder according to claim 1, for use in wheel speed sensors.

4. A wheel speed sensor that comprises the magnetic encoder according to claim 1.

5. A magnetic encoder according to claim 1, wherein the under coat adhesive comprises epoxy resin, organopolysiloxane as a hydrolysis condensate of organoalkoxysilane represented by the general formula $X_n$—$Si(OR)_{4-n}$, where X is a functional group reactive with rubber or resin, R is a lower alkyl group, and n is 1 or 2, colloidal silica, and an amide- or imide-based epoxy resin curing agent.

6. A magnetic encoder according to claim 5, wherein the organopolysiloxane is copolymerization oligomers of amino group-containing alkoxysilane and vinyl group-containing alkoxysilane.

7. A magnetic encoder according to claim 5, wherein the under coat adhesive composition comprises 45 to 75 wt. % epoxy resin, 10 to 40 wt. % of organopolysiloxane, 3 to 10 wt. % of colloidal silica, and 0 to 5 wt. % of an amide- or imide-based epoxy resin curing agent.

8. A magnetic encoder according to claim 7, wherein the organopolysiloxane is copolymerization oligomers of amino group-containing alkoxysilane and vinyl group-containing alkoxysilane.

* * * * *